3,321,543
PREPARATION OF 1,7-OCTADIENE
Walter K. Henle, Orinda, Calif., assignor to Shell Oil Company, New York, N.Y., a corporation of Delaware
No Drawing. Filed May 12, 1964, Ser. No. 366,911
5 Claims. (Cl. 260—680)

This invention relates to the preparation of 1,7-octadiene from 1,3-butadiene.

The preparation of a di-functional organometallic compound through the dimerization of butadiene, in the presence of an inactive ether and an alkali metal, e.g., sodium or potassium, is already known, e.g., U.S. 2,352,461. Various methods for reacting the alkali metal and conjugated diene may be employed: (1) subjecting the mixture of alkali metal and diene to agitation while large pieces of sodium are gradually abraded or scraped to supply a continuously fresh reactive metal surface, or (2) finely divided sodium i.e., of less than 20 micron particle size is dispersed in kerosene to which the diene is added. The subsequent hydrolysis of the resulting disodiooctadiene, hereinafter designated DSO, yields a mixture of six linear octadienes with the selectivity for the highly desirable $\alpha,\omega$ unsaturated compound, i.e., the 1,7-isomer, being below 10%.

It is a principal object of the present invention to provide an improved method for converting disodiooctadiene to 1,7-octadiene.

This object will be better understood and others will be apparent from the description of the invention.

Now, in accordance with this invention, it has been found that by reacting disodiooctadiene (DSO) with a polyvalent metal halide in at least a stoichiometric amount and at a temperature sufficient to dissolve at least a stoichiometric amount of the halide in an inactive solvent, followed by hydrolysis, an essentially stoichiometric yield of the 1,7-isomer of octadiene is obtained.

Although the exact nature of the reaction involved is not completely understood, it is proposed that the following incomplete equations are represettative:

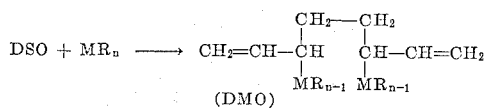

or

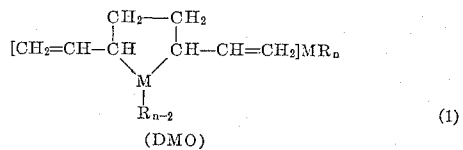

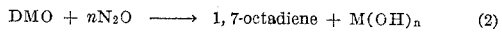

$$DMO + nN_2O \longrightarrow 1,7\text{-octadiene} + M(OH)_n \quad (2)$$

The term "$n$" denotes the valence of the metal involved and is a whoe number from 2 to 3. By "R" is meant either a halide or an alkyl, aryl or alkoxide of from 1 to 5 carbons, at least one R being halide, while "M" is a metal as described infra.

The metal halide compound includes polyvalent metals, wherein the valence state is a whole number from 2 to 3. Suitable halides are those of metals forming metal-carbon bonds which are readily hydrolyzed by $H_2O$ or alcohols, and in particular, metals of Group II and III of the Periodic Table of Elements having an atomic number of 5 to 49. Compounds which have been found especially useful in this reaction include those containing aluminum, magnesium, boron or zinc, with compounds containing aluminum being the most preferred. The metal can be combined with only halogen, e.g., aluminum chloride, or can be an organo metal halide such as a Grignard reagent. The metal halide compound should be of the general formula $MR_n$ wherein M is a metal having a valence of 2 or 3; R is halogen or on alkyl, aryl or alkoxide containing from 1 to 5 carbons, at least one R being halogen, most preferably a halogen having an atomic number of from 17 to 35; and $n$ is a whole number from 2 to 3. Compounds which are represented by this general formula include, for example, aluminum chloride, diethyl aluminum chloride, zinc chloride, magnesium bromide, magnesium chloride, methyl magnesium bromide, dimethyl chloroborate, and chloro diisopropylborate.

Although either sodium or potassium, i.e., an alkali metal with an atomic number of 11 to 19, inclusive may be used as the alkali metal reactant, the use of sodium is preferred since sodium gives excellent selectivity and yields of dimerized products, and it is cheaper and more readily available. Mixtures of sodium and potassium, and of sodium and calcium can also be used.

The disodiooctadiene may be prepared by any of the known prior art methods. Furthermore, 1,7-octadiene may be prepared in situ by reacting sodium, 1,3-butadiene and the metal halide compound and hydrolyzing the intermediate. However, merely for purposes of explanation, the following specific method of preparing disodiooctadiene is included.

The preparation of DSO in a batch operation was performed in an attritor assembly containing 400 milliliters of ¼ inch diameter stainless steel balls. The assembly was placed overnight in a nitrogen purged dry box. One-half mole of high-surface sodium-on-sodium chloride carrier was transferred into the attritor where lines for the transfer of liquid and gases were secured to the reactor. Purging of the system with nitrogen was continued and maintained throughout the reaction. The attritor vessel was cooled and maintained at $-70°$ C. in an IPA—$CO_2$ bath, and then 1 liter of purified and distilled dimethyl ether was pumped into the attritor under nitrogen pressure. One-half mole of butadiene, stored in a trap at $-20°$ C. was carried as vapor with a nitrogen stream within one hour into the reaction stream. After the addition of butadiene the $CO_2$—IPA bath was removed from the reactor, and the yellow reaction product was carefully discharged through a gate valve at the bottom of the reactor into a flask containing excess ice water in a nitrogen atmosphere for hydrolysis. The excess dimethyl ether solvent was then permitted to volatilize at room temperature in a ventilated hood. The octadienes mixture (hydrocarbon layer) was then separated from the aqueous phase, and distilled with a vacuum rotary film evaporator to remove any high boiling polymers which may have resulted from impurities in the salt medium or the butadiene feed. The yield of mixed octadienes was 26 grams, with about 4.5% being 1,7-octadiene.

For the purposes of the present invention, it is generally preferred that the metal halide compound be dissolved and/or dispersed in an organic solvent, the solvent being inactive or of a low reactivity with DSO and additionally one in which the metal halide compound will have a substantialy solubility. Solvents satisfying these two criteria include ethers, saturated hydrocarbons and unsubstituted aromatics, the preferred solvent being a lower dialkyl ether, e.g., diethyl ether. Other materials which are highly desirable as solvents include dimethyl ether, dimethoxy ethane, tetrahydrofuran, or dimethyl ether of diethylene glycol.

Although the reaction can be carried out with stoichiometric quantities of the reactants, provided that the DSO is slowly added with stirring to a solution of the metal halide compound, it has been found that a slight excess up to two moles of metal halide compound to one mole of disodiooctadiene is advantageous, with an excess of about 10% mole being the most preferred. The amount of solvent necessary to dissolve all the metal halide compound will depend of course on the specific compound being used and the particular solvent involved. Any concentration up to and including a 50% wt. solution will usually be satisfactory, especially 5–30% wt., with a 10% solution being highly advantageous. Disodiooctadiene is most advantageously dispersed in a solvent such as a saturated aliphatic ether, e.g., dimethyl ether, as illustrated in the prior art.

The reaction temperature of the DSO and metal halide compound can be varied quite widely within the scope of this invention. Because of the exothermic quality of the reaction it is advantageous to maintain the initial temperature of the reaction as low as possible with a range of $-50°$ C. to room temperature, i.e., $25°$ C., being acceptable. However, temperatures below the boiling point of, e.g., dimethyl ether, ($-22°$ C.) are most advantageous.

The reaction time required in the examples, infra, for the dimerization of the 1,3-butadiene to DSO is about 1 hour per mol, while the reaction of the DSO and the metal halide compound is practically instantaneous and at the most only a few minutes. Therefore, if the DSO is formed in the presence of the metal halide, thereby forming the metal-octadiene in situ, the rate-determining reaction is that of the dimerization of the 1,3-butadiene. For practical purposes the preferred range for the in situ reaction would be from 1 hour to 3 hours. The reaction between DSO and the metal halide compound is usefully performed in a period of 5 to 20 minutes.

Although any order of mixing the reactants may be used, it is preferred to slowly add a dispersion of DSO in a solvent, such as dimethyl ether, with stirring, to an ether solution of the metal halide compound. Best results are obtained where the reactants are retained in a ice-water bath, wherein the temperature is kept below the boiling point of the solvent. The rapid metallative exchange reaction can be followed by vaporization, or the reaction product can be treated in toto, with water (or alcohol), to hydrolyze (or alcoholize) the resulting metal complex. If water is used, two distinct layers form wherein simple separation of the 1,7-octadiene is possible.

The 1,7-isomer of octadiene finds use as a chemical intermediate, and is valuable in the preparation of drying oils, polymers, copolymers and plasticizers. The resulting diacid and glycol derivatives are useful in the formation of esters, polyesters, polyamides and generally as chemical intermediates.

The following specific examples of the invention will serve to illustrate more clearly the application of the invention, but are not to be construed as in any manner limiting the invention.

0.25 mol of DSO on 150 grams of NaCl suspended in 1 liter of dimethyl ether was added slowly with stirring to 0.5 mol of $Al_2Cl_6$ dissolved in 1 liter of diethyl ether at a temperature above $0°$ C. A significant color change occurred upon the formation of a soluble aluminum octadiene compound. The dimethyl ether was allowed to evaporate and the residue was hydrolyzed in excess ice-water. Removal of the aqueous phase gave a hydrocarbon product of 99% pure 1,7-octadiene in a 90% yield.

Similar hydrolysis of the reaction product of DSO with $(CH_3O)_2B$-, $CH_3Mg$-, Zn- and Mg-halides gave yields of 1,7-octadiene in the amounts of 93%, 85%, 79% and 70%, respectively.

I claim as my invention:

1. A process of preparing 1,7-octadiene by reacting di(alkali metal) octadiene, the alkali metal having an atomic number of from 11 to 19, inclusive, with a metal halide $MR_n$, wherein M is a metal selected from the group consisting of aluminum, boron, magnesium and zinc, R is selected from the group consisting of halide, alkyl, aryl and alkoxide, wherein the hydrocarbon contains from 1 to 5 carbons, provided that at least one R is halide, and $n$ is a whole number of from 2 to 3, and hydrolyzing the resulting reaction product to obtain the 1,7-octadiene.

2. A process in accordance with claim 1 wherein the metal halide is in a fine suspension in a liquid lower dialkyl ether.

3. A process in accordance with claim 2 wherein the liquid lower dialkyl ether is diethyl ether.

4. A process in accordance with claim 1 wherein the metal halide is aluminum chloride.

5. A process of preparing 1,7-octadiene by reacting sodium, butadiene and aluminum chloride in a liquid lower dialkyl ether solution at a temperature of from $-50°$ C. to $0°$ C. followed by hydrolyzing the resulting reaction product.

References Cited by the Examiner
UNITED STATES PATENTS 2,352,461  6/1944  Walker _____ 260—537
3,090,819  5/1963  Foster _____ 260—665

DELBERT E. GANTZ, *Primary Examiner.*

G. E. SCHMITKONS, *Assistant Examiner.*